Dec. 6, 1966 R. K. LOGAN 3,290,537

ELECTROLUMINESCENT DEVICE INCLUDING A DIELECTRIC SUBSTRATE HAVING A PLURALITY OF CLOSELY-SPACED THIN WIRE CONDUCTORS PASSING THERETHROUGH

Filed Dec. 26, 1963

INVENTOR.
ROBERT K. LOGAN

BY

ATTORNEYS

United States Patent Office 3,290,537

Patented Dec. 6, 1966

3,290,537

ELECTROLUMINESCENT DEVICE INCLUDING A DIELECTRIC SUBSTRATE HAVING A PLURALITY OF CLOSELY-SPACED, THIN WIRE CONDUCTORS PASSING THERETHROUGH

Robert K. Logan, 669 Skyview Drive, El Cajon, Calif.

Filed Dec. 26, 1963, Ser. No. 333,772
6 Claims. (Cl. 313—108)

The invention described herein may be manufactured and used by or for the Government of the United States of America for governmental purposes without the payment of any royalties thereon or therefor.

The present invention relates generally to devices which produce light emission by subjecting a phosphor to an electroluminescence-inducing electrical field. More particularly, the invention concerns such a device which is capable of being used to produce a wide variety of light-defined displays of either static or dynamic character.

As known in the (prior) art, electroluminescent devices generally comprise a pair of electrodes in the form of layers with an electroluminescent phosphor material in sandwiched position between these electrode layers. With at least one of these electrode layers translucent or transparent, light produced by electroluminescence of the phosphor material is available for a visual light-defined display. The respective electrode layers are generally connected to the opposite poles of a source of alternating voltage and it is the resulting varying electrical field interposed across the phosphor material by the coacting electrode layers which actuates the phosphor material to its light-defining luminescence.

When it is desired that a specific configuration or design be delineated by the light pattern produced by the electroluminescent device, it has been necessary previously to accomplish the desired configuration or design in one of the electrode layers between which the phosphor material is immediately interposed. Incorporating the required design in either of these electrode layers is a difficult and time-consuming task and, as an end-product of manufacture, each such luminescent device is limited to the fixed light-defining design or configuration incorporated into it.

The present invention produces an electroluminescent device wherein the light-defined pattern produced thereby can provide an almost infinite variety of designs or configurations which can be either static or dynamic in character. It is predicated upon the use, in place of the base-position electrode layer of previous electroluminescent devices, of a dielectric substrate which is filled with a plurality of discrete conductors rigidly sealed in the dielectric material of the substrate such that when an electric current is applied to one side of the substrate it will be conducted through the substrate to the opposite side thereof. With the phosphor material sandwiched between one side of this dielectric substrate (bearing the numerous discrete conductors) and a conventional translucent electrode layer which is connected to one pole of the actuating voltage source, a conductive member of any desired configuration applied to the opposite side of the discrete-conductors-bearing dielectric substrate and connected to the other pole of the actuating voltage source will cause the electroluminescent device to emit a light pattern which conforms to the configuration of said conductive member.

The conductive member applied in intimate contact with the underside of the dielectric substrate (bearing the numerous discrete conductors) to determine the configuration or design of the light pattern emitted by the electroluminescent device can be of fixed (i.e., static) configuration to achieve a static light pattern or it can be a moving contact member (e.g. a contact-establishing brush) to achieve a dynamic light pattern with the electroluminescent device. The electroluminescent device less the configuration-establishing conductive member can be produced as a final manufactured product which requires no modification to meet the demand of being used in the portrayal of design or symbols of wide variety.

Among objects of importance of the present invention are the following:

To provide an electroluminescent device which provides a wide variety of light-defined displays of either static or dynamic character.

To provide an electroluminescent lamp having all-numeral and/or all-character indicating capacity.

To provide an electroluminescent lamp display in which there is no clue of the symbol to be presented until such symbol is actually displayed by the lamp.

To provide, for use in the provision of a wide variety of light-defined displays of either static or dynamic character, an electroluminescent base stock which can be employed as a final manufactured product without modification.

To provide an electroluminescent display device susceptible of use in an alphanumeric display module having all-numeral and all-character capacity.

Other objects and many of the attendant advantages of this invention will be readily appreciated as the same becomes better understood by reference to the following detailed description when considered in conjunction with the accompanying drawing in which.

Figures 1, 2, 3, 4, 5, 6:
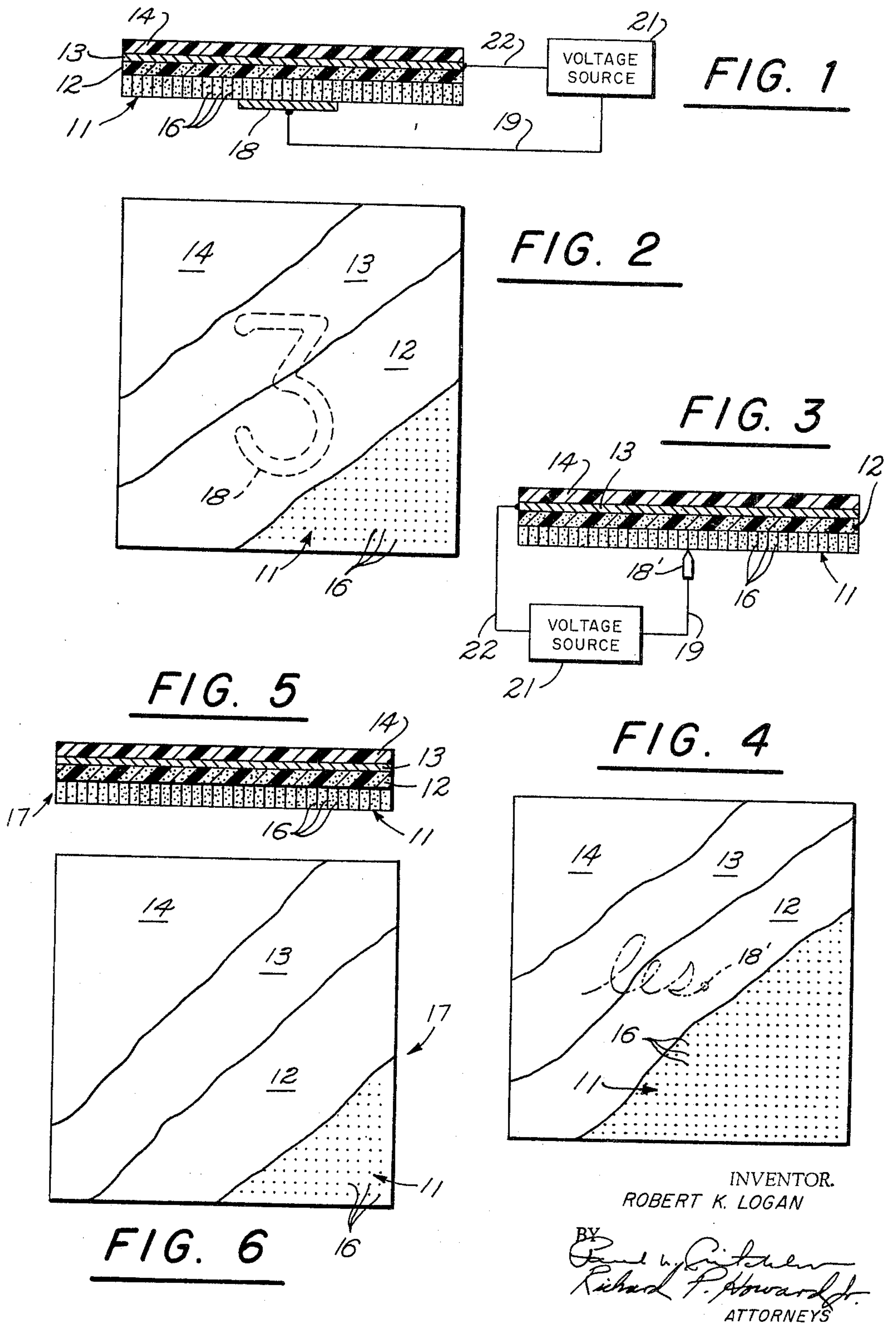
FIG. 1 is an elevational view, in section, of a static-configuration embodiment of the electroluminescent device of the invention.
FIG. 2 is a plan view, partly in break-away, of the FIG. 1 embodiment.
FIG. 3 is an elevational view, in section, of a dynamic-configuration embodiment of the electroluminescent device of the invention.
FIG. 4 is a plan view, partly in break-away, of the FIG. 2 embodiment.
FIG. 5 is an elevational view of the electroluminescent base stock employed in the invention.
FIG. 6 is a plan view, partly in break-away, of the electroluminescent base stock.

Looking now to the various figures of the drawing, a substrate 11 has applied thereon, in the sequence named, an electroluminescent dielectric-phosphor layer 12, a conductive coating layer 13 which may be either translucent or transparent and a protective transparent or translucent coating layer 14. Optimally, both conductive coating layer 13 and protective coating layer 14 are transparent, as opposed to merely being translucent. An electrical terminal is incorporated in the conductive coating layer 13. Dielectric-phosphor layer 12 consists of a highly concentrated mixture of electroluminescent phosphor and a resin binder material. The phosphor employed is any conventional electroluminescent phosphor (such as, for example, the well-known zinc sulfide activated by copper and coactivated by chlorine). Conductive coating layer 13 may be formed of metal such as gold, silver or aluminum which is deposited by vapor deposition under vacuum to achieve a very thin layer of the metal involved—the thinness of the metal layer achieving the required translucency or transparency for this conductive layer 13. Layer 13 can also be formed with one of the many newly-developed plastic transparent and conductive coatings now available. Protective layer 14 is relatively heavy and preferably consists of a moisture-resistant, abrasion-resistant, transparent coating material such as polyurethane. Substrate 11 consists of a dielectric material within which there are rigidly sealed numerous discrete conductors 16 such that, when an electric current is applied to one side of the substrate 11, such current will be conducted through substrate 11 to the opposite side thereof. The discrete conductors 16 are fine conductive wires, rectilinear in longitudinal shape and generally with circular cross-section, which extend (as seen in each of FIGS. 1, 3 and 5) through the dielectric material of the substrate 11 from the one major face to the other major face of this substrate 11. These wires are separated from one another, are oriented normal to the major faces of substrate 11 and, viewed on end, are present in a concentration which may vary between 100–15,000 per square inch. This substrate 11 may take any desired shape or size and may be in the form of a sheet, plate or rod.

This combination of substrate 11 (with its discrete conductors 16) and the respective layers 12, 13, 14 and 16 can be produced as a final manufactured product and is appropriately identifiable as an electroluminescent base stock 17. This electroluminescent base stock 17 is a subcombination of the electroluminescent devices portrayed in FIGS. 1–4 and is separately shown herein in FIGS. 5 and 6.

FIGS. 1 and 2, which portray a "static-configuration" embodiment of the electroluminescent device of the invention, in addition to the electroluminescent base stock 17 (previously defined), show a conductive member 18 which is of fixed or "static" configuration and which is maintained in intimate contact with the underside of substrate 11. Conductive member 18 can be in the form of a conductive coating of the desired configuration applied to the underside of substrate 11 or it can be any other conductive member (of the desired configuration) which is maintained in any appropriate manner in intimate contact with this underside of substrate 11. This conductive member 18 is connected by lead 19 to the one pole of alternating voltage source 21 whereas conductive layer 13 is connected by lead 22 to the other pole of voltage source 21.

The pattern of light-excitation produced in electroluminescent phosphor layer 12 is controlled by the pattern of the electrical field set up across this dielectric-phosphor layer 12. With conductive layer 13 and substrate 11 both coextensive with dielectric-phosphor layer 12, the configuration or shape of conductive member 18 as it registers intimate contact with the underside of substrate 11 will determine the pattern of the electrical field emplaced across dielectric-phosphor layer 12 for, by means of discrete conductors 16, that portion of dielectric substrate 11 which overlies the substrate-registering portion of conductive member 18 will be transformed into an operative electrode structure for coacting with conductive layer 13 to actuate luminescence in that portion of dielectric-phosphor layer 12 which lies intermediate both of the opposing electrode structures. The resulting light pattern will conform to the substrate-mating configuration of conductive member 11. This light pattern will be transmitted readily through conductive layer 13 and protective layer 14 to effectuate a visual display.

The invention embodiment set forth in FIGS. 3 and 4 differs from the FIGS. 1 and 2 embodiment only in the nature of the conductive member which herein is designated 18′. Conductive member 18′ is a moving contact member such as a brush, for example, which, like conductive member 18, is maintained in intimate contact with the underside of substrate 11, but in this instance, instead of being of a fixed shape in a static position, is intended to trace out a predetermined path in its contact with substrate 11. This moving-contact conductive member 18′ traces its pattern-defining path along the underside of substrate 11 at such a rate of travel that, during the operative time period of the visual display produced by the electroluminescent device, the entire desired pattern pathway traced out on the underside of substrate 11 is defined by actuated luminescence in dielectric-phosphor layer 12. The rate of travel of conductive member 18′ along the surface of substrate 11 is quite rapid compared to the "decay" time of the luminescence produced in dielectric-phosphor layer 12. Thus a "dynamic" configuration display is effectuated in the FIGS. 3 and 4 embodiment.

In the phosphor-layer 12 a so-called "D.C. phosphor" can be employed in an alternative embodiment of the invention and, in that instance, voltage source 21 would be replaced by a D.C. voltage source. The invention further contemplates the use of a photo-conductive element in conjunction with a controllably-movable light beam as a substitute for conductive member 18′ for selectively activating substrate 11 as one of the electroluminescent-producing electrodes of the device.

Obviously many modifications and variations of the present invention are possible in the light of the above teachings. It is intended to cover all changes and modifications which may be made without departing from the spirit and scope of this invention.

What is claimed is:

1. An electroluminescent device comprising in combination:

(a) a light-transmissive electrically-conductive electrode layer;

(b) an electroluminescent dielectric-phosphor layer underlying said electrically-conductive electrode layer;

(c) a dielectric substrate underlying said dielectric-phosphor layer, said dielectric substrate consisting of a dielectric material filled with a plurality of discrete closely-spaced thin wire conductors rigidly sealed in said dielectric material such that when an electric current is applied to one side of said substrate said current will be conducted through said substrate to the opposite side thereof; and (d) conductive means, underlying said dielectric substrate and in intimate contact therewith, for defining a predetermined selective locus of contact between said conductive means and said dielectric substrate;

(e) said electrode layer and said conductive means being adapted to be electrically connected respectively to the opposite poles of a source of actuating voltage for cooperatively inducing an activating electrical field across said dielectric-phosphor layer to selectively activate to luminescence that portion of said dielectric-phosphor layer which lies intermediate said electrode layer and the locus of contact between said conductive means and said dielectric substrate as determined by said conductive means, the pattern of light definition produced by said electroluminescent device, when activated, thus conforming to the configuration of the locus of contact between said conductive means and said dielectric substrate.

2. An electroluminescent device comprising in combination:

(a) a light-transmissive electrically conductive electrode layer;

(b) an electroluminescent dielectric-phosphor layer underlying said electrically-conductive electrode layer;

(c) a dielectric substrate underlying said dielectric-phosphor layer, said dielectric substrate consisting of a dielectric material filled with a plurality of discrete conductors rigidly sealed in said dielectric material such that when an electric current is applied to one side of said substrate said current will be conducted through said substrate to the opposite side thereof; and (d) a conductive member, having a preselected shape, underlying said dielectric substrate and in intimate contact therewith;

(e) said electrode layer and said conductive member being adapted to be electrically connected respectively to the opposite poles of a source of actuating voltage for cooperatively inducing an activating electrical field across said dielectric-phosphor layer to selectively activate to luminescence that portion of said dielectric-phosphor layer which lies between said electrode layer and that portion of said conductive member which is in intimate contact with said dielectric substrate, the pattern of light definition produced by said electroluminescent device, when activated, thus conforming to the shape of said conductive member as it contacts said dielectric substrate.

3. An electroluminescent device comprising in combination:

(a) a light-transmissive electrically-conductive electrode layer;

(b) an electroluminescent dielectric-phosphor layer underlying said electrically-conductive electrode layer;

(c) a dielectric substrate underlying said dielectric-phosphor layer, said dielectric substrate consisting of a dielectric material filled with a plurality of discrete closely-spaced thin wire conductors rigidly sealed in said dielectric material such that when an electric current is applied to one side of said substrate said current will be conducted through said substrate to the opposite side thereof; and (d) a controllably-movable conductive member in intimate contact with said dielectric substrate and adapted to be controllably moved to trace out a prescribed pathway of contact with said dielectric substrate;

(e) said electrode layer and said movable conductive member being adapted to be electrically connected respectively to the opposite poles of a source of actuating voltage for cooperatively inducing an activating electrical field across said dielectric-phosphor layer to selectively activate to luminescence that portion of said dielectric-phosphor layer which lies between said electrode layer and the contact pathway traced out on said dielectric substrate by said movable conductive member, the pattern of light definition produced by said electroluminescent device, when activated, thus conforming to the configuration of the contact pathway traced out upon said dielectric substrate by said controllably-movable conductive member.

4. The electroluminescent device of claim 2 wherein said electrically-conductive electrode layer is substantially coextensive in length and width with said dielectric-phosphor layer.

5. The electroluminescent device of claim 1 wherein said electrically-conductive electrode layer is substantially coextensive in length and width with said dielectric-phosphor layer.

6. An electroluminescent base stock, adapted for immediate use in an electroluminescent device which has a capacity for defining a wide variety of light-defined patterns, comprising:

(a) a light-transmissive dielectric-material protective layer;

(b) a light-transmissive electrically-conductive electrode layer underlying said dielectric material protective layer;

(c) an electroluminescent dielectric-phosphor layer underlying said electrically-conductive electrode layer; and (d) a dielectric substrate underlying said dielectric-phosphor layer, said dielectric substrate consisting of a dielectric material filled with a plurality of discrete closely-spaced thin wire conductors rigidly sealed in said dielectric material such that when an electric current is applied to one side of said substrate said current will be conducted through said substrate to the opposite side thereof.

References Cited by the Examiner

UNITED STATES PATENTS

| | | | |
|---|---|---|---|
| 2,015,570 | 9/1935 | Sabbah | 313—74 |
| 2,189,340 | 2/1940 | Donal | 264—24 |
| 2,922,993 | 1/1960 | Sack | 313—108 |
| 2,976,447 | 3/1961 | McNaney | 313—108 |
| 3,026,501 | 3/1962 | Gray | 313—108 |
| 3,059,118 | 10/1962 | Koury | 313—108.1 |
| 3,064,391 | 11/1962 | Devol | 264—108 |
| 3,218,497 | 11/1965 | Motson | 313—108 |

JAMES W. LAWRENCE, *Primary Examiner.*

R. JUDD, *Assistant Examiner.*